US012686462B2

(12) United States Patent
Roh et al.

(10) Patent No.: US 12,686,462 B2
(45) Date of Patent: Jul. 21, 2026

(54) ELECTRIC PERSONAL MOBILITY DEVICE WITH FOLD MECHANISM

(71) Applicant: GM GLOBAL TECHNOLOGY OPERATIONS LLC, Detroit, MI (US)

(72) Inventors: Youngseok Roh, Incheon (KR); Choonghee Rhew, Ansan-si (KR); Jaewook Lee, Seoul (KR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 405 days.

(21) Appl. No.: 18/448,331

(22) Filed: Aug. 11, 2023

(65) Prior Publication Data

US 2025/0050965 A1     Feb. 13, 2025

(51) Int. Cl.
*B62K 15/00* (2006.01)
*B62K 11/02* (2006.01)

(52) U.S. Cl.
CPC ............ *B62K 15/006* (2013.01); *B62K 11/02* (2013.01); *B62K 2202/00* (2013.01)

(58) Field of Classification Search
CPC ..... B62K 11/02; B62K 15/006; B62K 15/008
See application file for complete search history.

(56) References Cited

U.S. PATENT DOCUMENTS

| | | | | | |
|---|---|---|---|---|---|
| 8,720,918 B2 * | 5/2014 | Liao | ..................... | B62K 15/006 |
| | | | | 280/87.041 |
| 2012/0018968 A1 * | 1/2012 | Joslin | ..................... | B62K 3/002 |
| | | | | 280/87.041 |

FOREIGN PATENT DOCUMENTS

| | | | | |
|---|---|---|---|---|
| CN | 202608994 U | 12/2012 | | |
| DE | 202022106044 U1 * | 11/2022 | .......... | B62K 15/006 |
| KR | 20180001996 A * | 1/2018 | ............ | B62K 3/002 |

* cited by examiner

*Primary Examiner* — William C Joyce
(74) *Attorney, Agent, or Firm* — CANTOR COLBURN LLP

(57) ABSTRACT

A personal mobility device includes a deck, wheels positioned at opposing ends of the deck, a pole extending at a proximal end from a first wheel of the wheels, and a handle located at a distal end of the pole. The deck includes a deck hinge located between a first deck end and a second deck end, and a deck latch operably connected to the deck hinge to retain the deck in an extended position, and configured such that releasing of the deck latch allows for folding of the deck about the deck hinge toward a folded position.

20 Claims, 8 Drawing Sheets

ELECTRIC PERSONAL MOBILITY DEVICE WITH FOLD MECHANISM

INTRODUCTION

The subject disclosure relates to personal mobility devices, in particular to storage and transportation of personal mobility devices.

Personal mobility devices, such as scooters are relatively small, portable devices that may be useful for commuting, errands, and the like. Often, such devices may be used to extend a commute from where a vehicle is parked, or from another location, such as a train station. As such, it is desirable that the personal mobility device be compact and easily carried or otherwise transported.

SUMMARY

In one exemplary embodiment, a personal mobility device includes a deck, wheels positioned at opposing ends of the deck, a pole extending at a proximal end from a first wheel of the wheels, and a handle located at a distal end of the pole. The deck includes a deck hinge located between a first deck end and a second deck end, and a deck latch operably connected to the deck hinge to retain the deck in an extended position, and configured such that releasing of the deck latch allows for folding of the deck about the deck hinge toward a folded position.

In addition to one or more of the features described herein, a first wheel bracket connects the first wheel to the deck, and a second wheel bracket connects a second wheel of the wheels to the deck. The deck latch is operably connected to first wheel bracket and the second wheel bracket such that releasing of the deck latch allows for rotation of the first wheel bracket and the second wheel bracket relative to the deck.

In addition to one or more of the features described herein, the deck latch includes a latch body rotatable about a latch body axis, a deck lock arm extending from the latch body and configured for engagement with a complimentary deck tab to retain the deck in the extended position. A first wheel release arm extends from the latch body and is operably connected to the first wheel bracket to selectably release the first wheel bracket via operation of the deck latch. A second wheel release arm extends from the latch body and is operably connected to the second wheel bracket to selectably release the second wheel bracket via operation of the deck latch.

In addition to one or more of the features described herein, the first wheel release arm and the second wheel release arm are operably connected to the first wheel bracket and the second wheel bracket via one of a wire or a strap.

In addition to one or more of the features described herein, the first wheel is at least partially nested in the second wheel when the deck is in the folded position.

In addition to one or more of the features described herein, the deck hinge is located at a midpoint between the first deck end and the second deck end.

In addition to one or more of the features described herein, the pole includes a lower pole portion operably connected to the first wheel, and an upper pole portion operably connected to the lower pole portion and to the handle. The upper pole portion is configured to be selectably movable in the lower pole portion to shorten a length of the pole.

In addition to one or more of the features described herein a pole stopper is configured to retain the upper pole portion in an extended position relative to the lower pole portion. The pole stopper is selectably releasable to allow for movement of the upper pole portion into the lower pole portion.

In addition to one or more of the features described herein a pole latch is operably connected to the lower pole portion. The pole latch is configured to retain the pole in an upright position relative to the deck and allow for folding of the pole toward the deck when the pole latch is released.

In addition to one or more of the features described herein the pole latch is configured to be automatically released when the upper pole portion is lowered into the lower pole portion.

In addition to one or more of the features described herein the handle includes a handle main body connected to the pole, and a first handle arm extending from a first side of the handle main body. The first handle arm is pivotable about a first arm pivot relative to the handle main body. A second handle arm extends from a second side of the handle main body opposite the first side and is pivotable about a second arm pivot relative to the handle main body. The first arm pivot is non-coaxial with the second arm pivot.

In addition to one or more of the features described herein, an electric motor is operably connected to the first wheel to drive the personal mobility device.

In another exemplary embodiment, a personal mobility device includes a deck, wheels positioned at opposing ends of the deck, and a pole extending at a proximal end from a first wheel of the wheels. The pole includes a lower pole portion operably connected to the first wheel, and an upper pole portion operably connected to the lower pole portion and to a handle. The upper pole portion is configured to be selectably movable in the lower pole portion to shorten a length of the pole. A pole latch is operably connected to the lower pole portion. The pole latch is configured to retain the pole in an upright position relative to the deck and allow for folding of the pole toward the deck when the pole latch is released. The pole latch is configured to be automatically released when the upper pole portion is lowered into the lower pole portion.

In addition to one or more of the features described herein, the pole latch includes a lower hinge portion connected to the first wheel, an upper hinge portion connected to the lower pole portion and connected to the lower hinge portion via a hinge pivot, and a connector latch configured to latch the upper hinge portion to the lower hinge portion.

In addition to one or more of the features described herein a release pin is operably connected to the connector latch and extending through the lower pole portion. The release pin is configured such that lowering of the upper pole portion into the lower pole portion engages the upper pole portion with the release pin thereby urging release of the connector latch and allowing for folding of the pole toward the deck.

In addition to one or more of the features described herein, a handle is positioned at a distal end of the pole. The handle includes a handle main body connected to the pole, and a first handle arm extending from a first side of the handle main body. The first handle arm is pivotable about a first arm pivot relative to the handle main body. A second handle arm extends from a second side of the handle main body opposite the first side and is pivotable about a second arm pivot relative to the handle main body. The first arm pivot is non-coaxial with the second arm pivot.

In addition to one or more of the features described herein, the deck includes a deck hinge positioned between a first deck end and a second deck end, and a deck latch operably connected to the deck hinge to retain the deck in an extended position and configured such that releasing of the deck latch allows for folding of the deck about the deck hinge toward a folded position.

In addition to one or more of the features described herein, a first wheel bracket connects the first wheel to the deck, and a second wheel bracket connects a second wheel of the wheels to the deck. The deck latch is operably connected to first wheel bracket and the second wheel bracket such that releasing of the deck latch allows for rotation of the first wheel bracket and the second wheel bracket relative to the deck.

In addition to one or more of the features described herein, the deck latch includes a latch body rotatable about a latch body axis, and a deck lock arm extending from the latch body and configured for engagement with a complimentary deck tab to retain the deck in the extended position. A first wheel release arm extends from the latch body and is operably connected to the first wheel bracket to selectably release the first wheel bracket via operation of the deck latch. A second wheel release arm extends from the latch body and is operably connected to the second wheel bracket to selectably release the second wheel bracket via operation of the deck latch.

In addition to one or more of the features described herein, the first wheel release arm and the second wheel release arm are operably connected to the first wheel bracket and the second wheel bracket via one of a wire or a strap.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
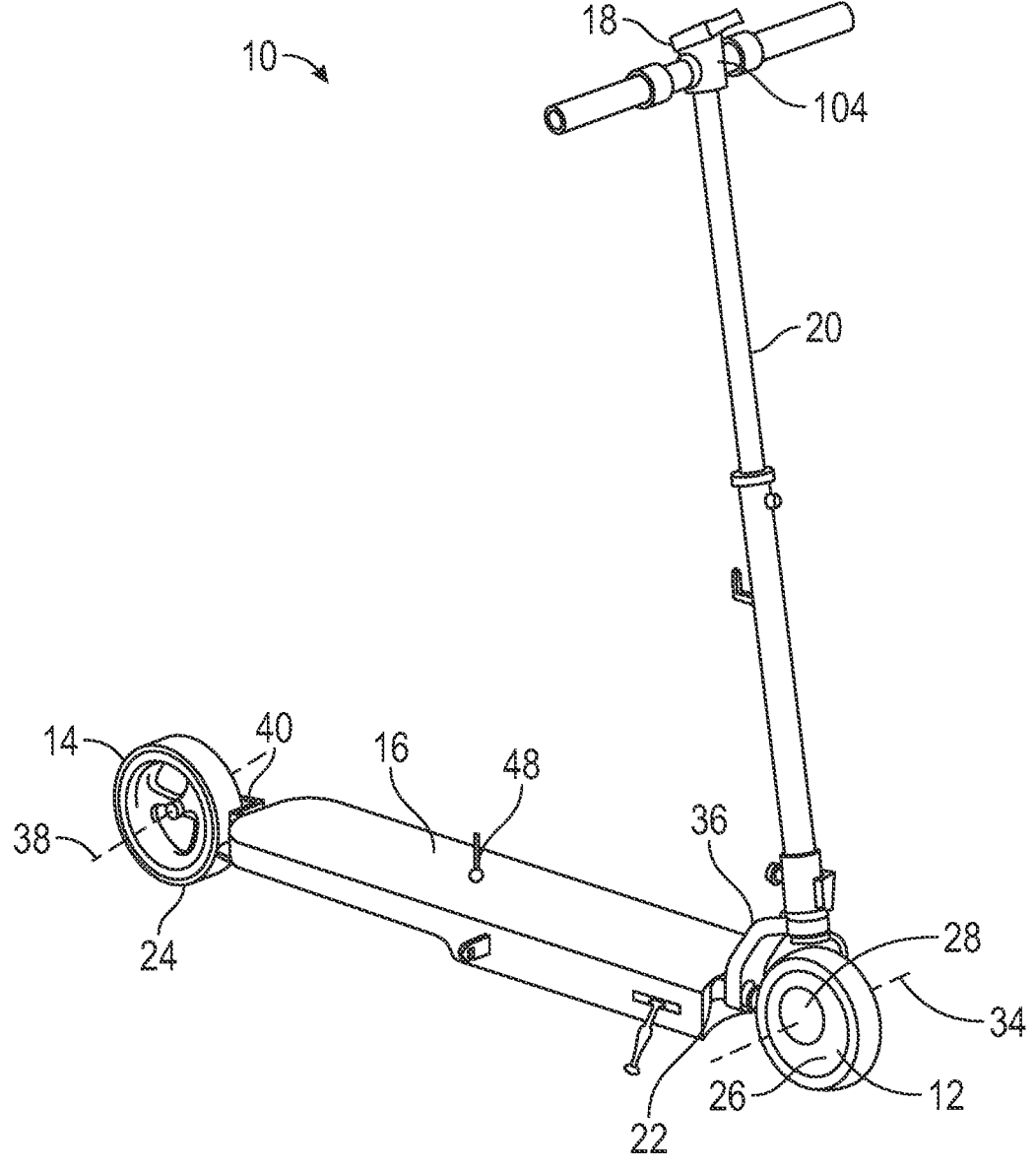
FIG. 1 is a perspective view of an embodiment of a personal mobility device.

The following description is merely exemplary in nature and is not intended to limit the present disclosure, its application or uses. It should be understood that throughout the drawings, corresponding reference numerals indicate like or corresponding parts and features.

In accordance with an exemplary embodiment, an exemplary personal mobility device 10 is illustrated in FIG. 1. The personal mobility device 10 is in the form of a scooter, and includes wheels 12, 14 operably connected to a deck 16. A handle 18 is configured for holding by a user while operating the personal mobility device 10. A pole 20 extends at a proximal end from wheel 12 to a proximal end at the handle 18. The handle 18 is connected to one or more of the deck 16 and one of the wheels 12, 14 via the pole 20. While two wheels 12, 14 are illustrated and described herein, one skilled in the art will readily appreciate that the personal mobility device 10 may have other numbers of wheels, such as three or four wheels. In the embodiment of FIG. 1, the wheels include a front wheel 12 at a first deck end 22 nearest the pole 20, and a rear wheel 14 at a second deck end 24 opposite the first deck end 22. In some embodiments, the personal mobility device 10 is powered by an electric motor 26, which may be embedded in the front wheel 12 as illustrated, or alternatively in the deck 16. A rechargeable energy storage system (RESS) 28, such as a battery, is located at, for example the front wheel 12 or in the deck 16 and is operably connected to the electric motor 26 to drive at least one of the wheels 12, 14 and propel the personal mobility device 10. In such electrically-powered embodiments the handle 18 may include controls such as a throttle control and/or a brake control to control operation of the personal mobility device 10.

The front wheel 12 is rotatable about a front wheel axis 34 and is connected to the deck 16 via a front wheel bracket 36 that extends from the front wheel 12 to the deck 16. Similarly, the rear wheel 14 is rotatable about a rear wheel axis 38 and is connected to the deck 16 via a rear wheel bracket 40 extending from the rear wheel 14 to the deck 16.

To improve portability of the personal mobility device 10, a number of features are included to reduce the personal mobility device 10 to a more compact configuration for carrying and/or storage, as will be described in detail below.

Figure 2:
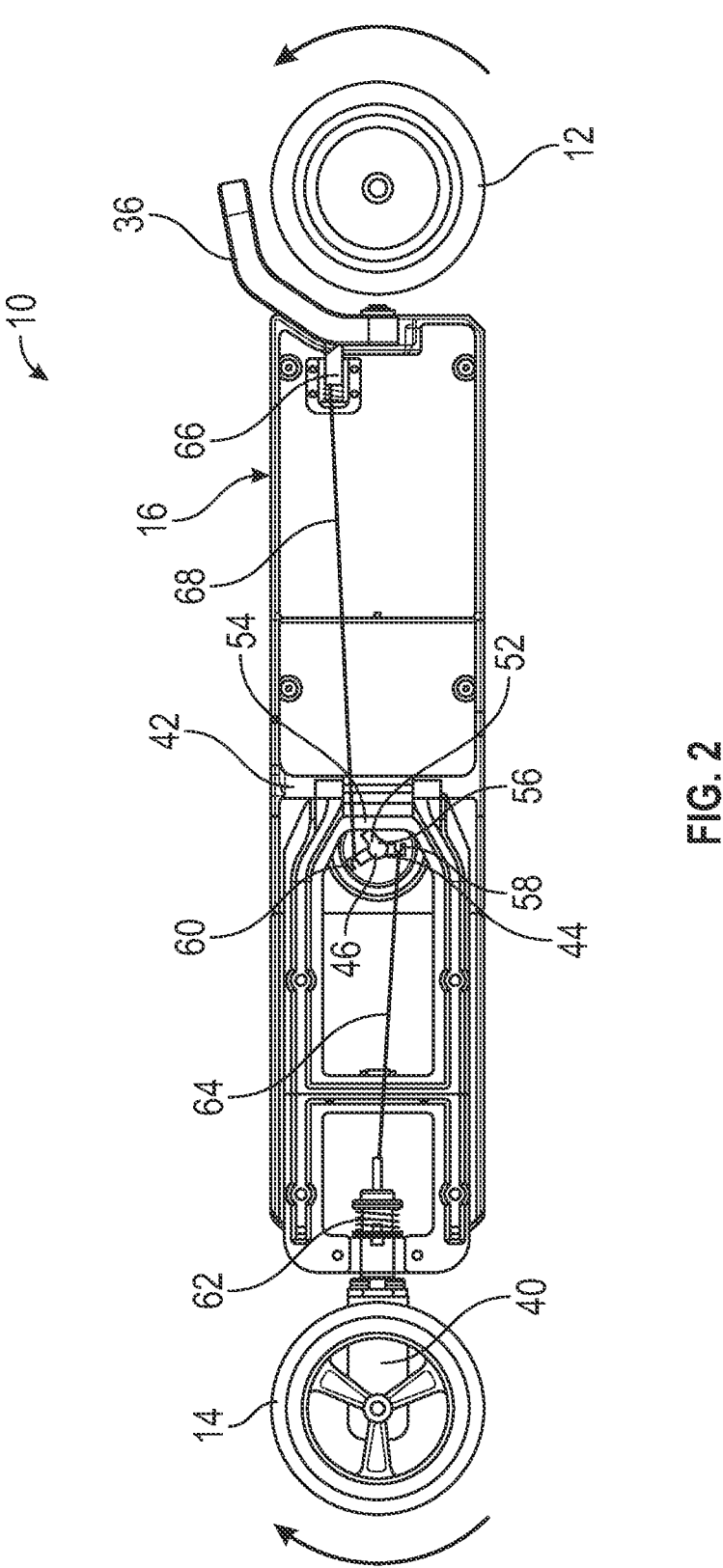
FIG. 2 is a bottom view of an embodiment of a deck of a personal mobility device.
Figure 3:
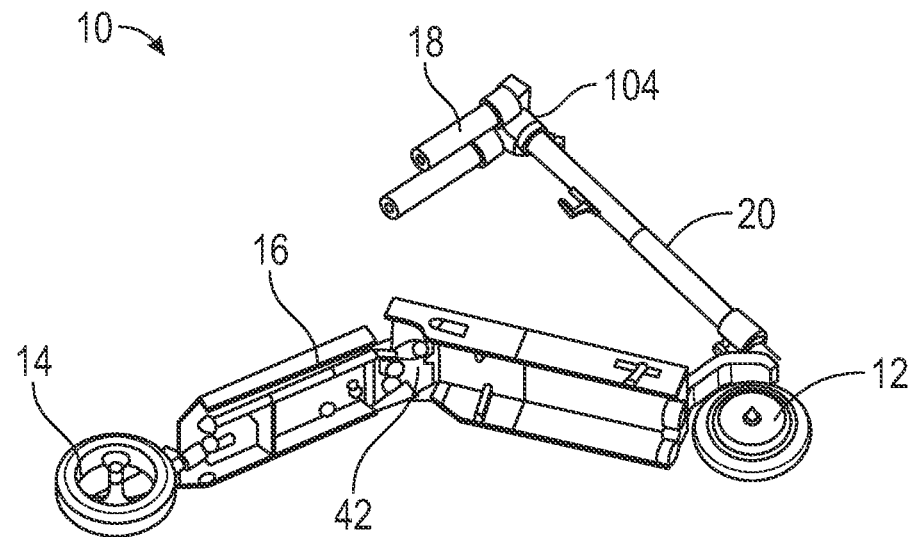
FIG. 3 is a perspective view of a partially folded personal mobility device.
Figure 4:
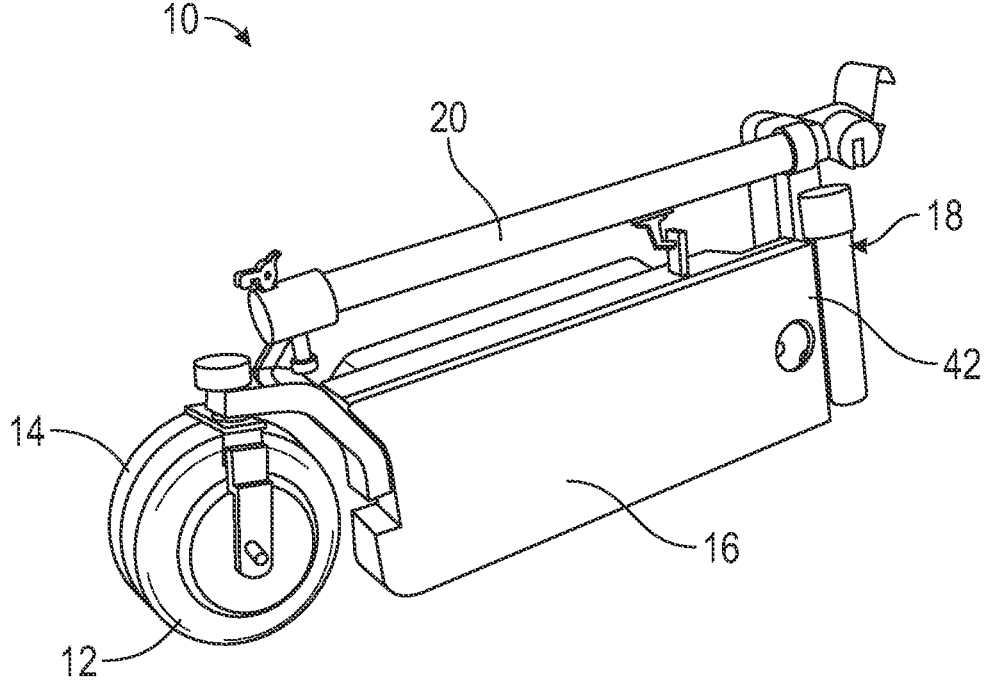
FIG. 4. is a perspective view of a folded personal mobility device.

Referring now to FIG. 2, the deck 16 includes a deck hinge 42 located at, for example, a midpoint of a deck length between the front wheel 12 and the rear wheel 14. The deck hinge 42 allows for folding of the deck 16 between an extended position, such as shown in FIG. 2, in which the personal mobility device 10 is rideable by a user, and a folded position such as shown in FIGS. 3 and 4, for storage or carrying of the personal mobility device 10 by the user. Referring again to FIG. 2, a deck latch 44 is disposed at the deck 16 to lock the deck 16 in the extended position, and to release the deck 16 from the extended position to allow for folding of the deck 16 about the deck hinge 42.

Figure 5:
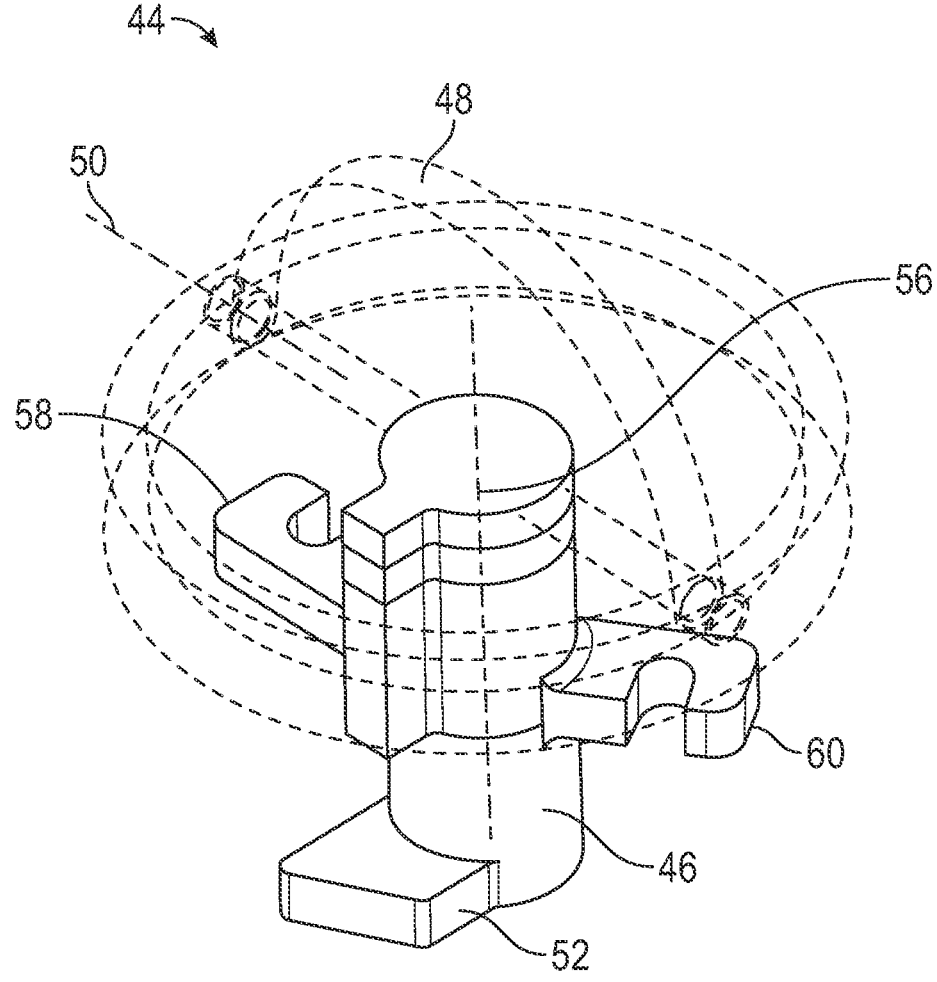
FIG. 5 is an illustration of an embodiment of a deck latch of a personal mobility device.

Referring now to FIG. 5, an exemplary embodiment of a deck latch 44 is illustrated. The deck latch 44 includes a latch body 46 and a latch handle 48 at a first end of the latch body 46, which is configured for use by the user to engage or release the deck latch 44. In some embodiments, such as illustrated in FIG. 1, the latch handle 48 is positioned flush with the deck 16 for normal operation of the personal mobility device 10. To utilize the deck latch 44, the latch handle 48 is rotated upward about a latch handle axis 50 to allow the user to grip the latch handle 48 more easily. The deck latch 44 further includes a deck lock arm 52 extending outwardly from the latch body 44, which engages a complimentary deck tab 54 (shown in FIG. 2) to lock the deck 16 in the extended position. To operate the deck latch 44 to release the deck lock arm 52 from the deck tab 54, the latch body 46 is rotated about a latch body axis 56 utilizing the latch handle 48. This rotates the deck lock arm 52 out of engagement with the deck tab 54, allowing the deck 16 to be folded about the deck hinge 42.

Referring again to FIG. 2, the deck latch 44 further includes a rear wheel release arm 58 and a front wheel release arm 60, each extending outwardly from the latch body 46. The rear wheel release arm 58 is operably connected to a rear wheel key 62 via, for example, a key release wire 64. The rear wheel key 62 holds the rear wheel bracket 40, and thus the rear wheel 14 in an operating position relative to the deck 16. Similarly, the front wheel release arm 60 is operably connected to a front wheel latch 66 via, for example, a latch release wire 68. The front wheel latch 66 holds the front wheel bracket 36 and thus the front wheel 12 in an operating position relative to the deck 16. The rear wheel key 62, the key release wire 64, the front wheel latch 66 and the latch release wire 68 as illustrated are merely exemplary structures, and one skilled in the art will readily appreciate that other suitable structures may be utilized to retain the front wheel 12 and the rear wheel 14. The deck latch 44 is configured such that when the latch body 46 is rotated via the latch handle 48 to release the deck lock arm 52 from the deck tab 54, the key release wire 64 and the latch release wire 68 act to release the rear wheel key 62 from the rear wheel bracket 40, and release the front wheel latch 66 from the front wheel bracket 36, respectively. This allows the rear wheel bracket 40 and the front wheel bracket 36 to be rotated relative to the deck 16, so that the rear wheel 14 is at least partially nested in the front wheel 12 when the personal mobility device 10 is in the folded position (shown in FIG. 4).

Figure 6:
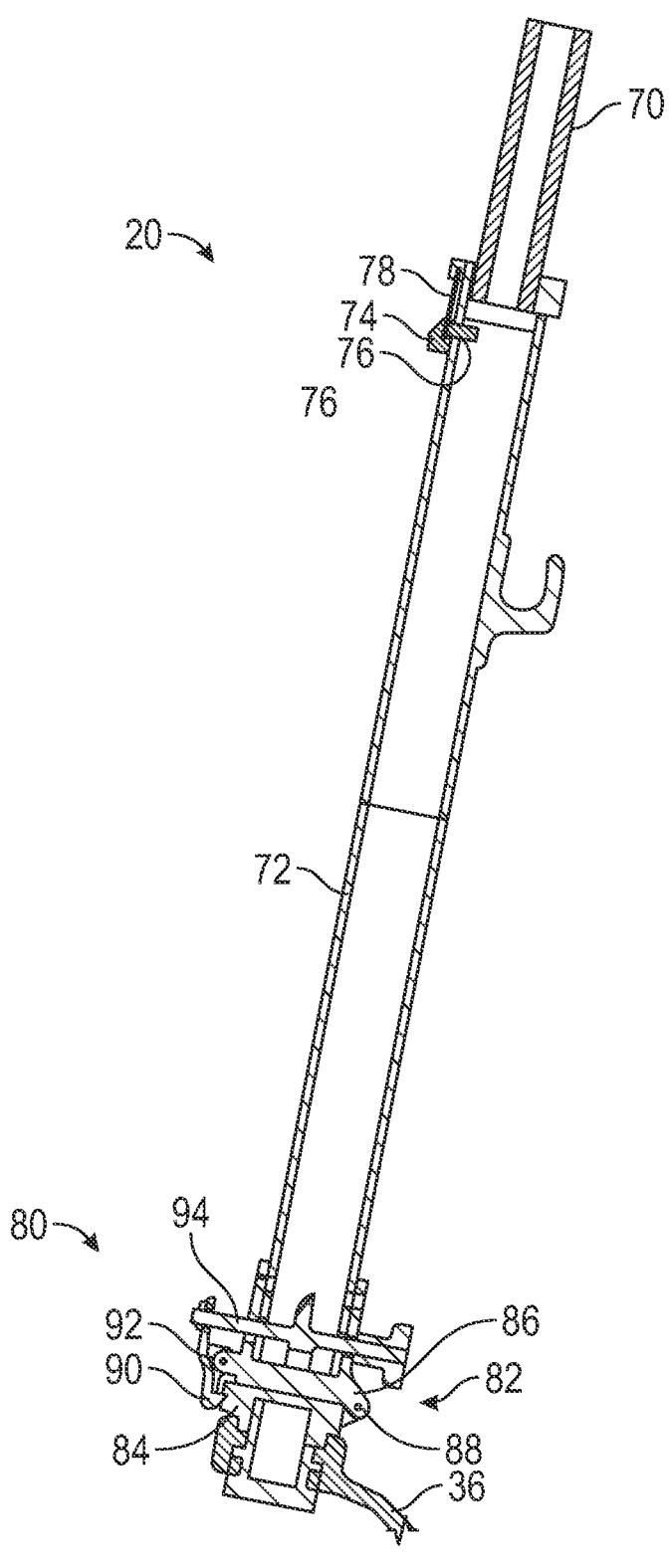
FIG. 6 is an illustration of a pole of a personal mobility device in an extended position.

The pole 20 of the personal mobility device 10 is configured to be folded into a pole stowed position as illustrated in FIG. 4. This is achieved through features such as described in greater detail below. The pole 20 is illustrated in an extended position in FIG. 6. The pole 20 includes an upper pole 70 and a lower pole 72, with the upper pole 70 slidably disposed inside the lower pole 72 in a telescoping arrangement. The pole 20 further includes a pole stopper 74 fixed to the lower pole 72 and extending through a stopper opening 76 in the upper pole 70 to retain the upper pole 70 in an extended position relative to the lower pole 72. In some embodiments, the pole stopper 74 is biased into the stopper opening 76 by a spring element, such as a leaf spring 78 connecting the pole stopper 74 to the lower pole 72.

Figure 7:
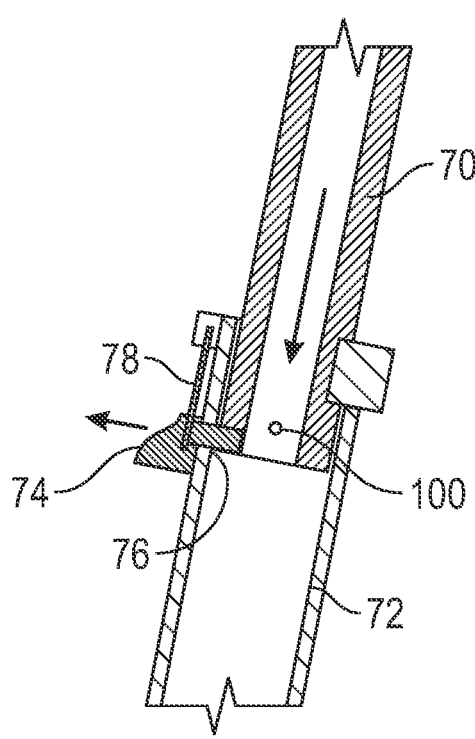
FIG. 7 an illustration of a pole of a personal mobility device being moved to a collapsed position.

Referring now to FIG. 7, to collapse the upper pole 70 into the lower pole 72, the user pulls the pole stopper 74 outward to remove the pole stopper 74 from the stopper opening 76. This allows the user to lower the upper pole 70 into the lower pole 72.

Figure 8:
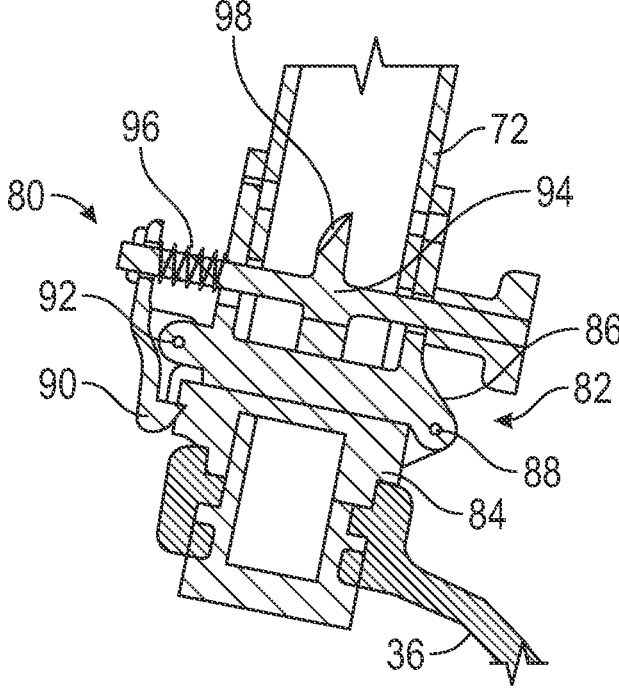
FIG. 8 is an illustration of an embodiment of a pole latch of a personal mobility device.

Referring again to FIG. 6, the pole 20 is connected to the front wheel bracket 36 via a pole latch 80, which is illustrated in more detail in FIG. 8. The pole latch 80 includes a latch hinge assembly 82 having a lower hinge portion 84 secured to the front wheel bracket 36, and an upper hinge portion 86 connected to the lower hinge portion 84 via a hinge pivot 88. The upper hinge portion 86 is connected to the lower pole 72, such that when the upper hinge portion 86 is rotated about the hinge pivot 88 the pole 20 is moved between an upright position such as in FIG. 1 and a stowed position such as in FIG. 4. Referring again to FIG. 8, the pole 20 is retained in the upright position by a connector latch 90, which is pivotably connected to the upper hinge portion 86 via a latch pin 92. When the pole 20 is in the upright position, the connector latch 90 engages with the lower hinge portion 84 to retain the pole 20 in the upright position. A release pin 94 extends through the lower pole 72, and is biased by, for example, a release spring 96 location between the lower pole 72 and the connector latch 90 to bias the connector latch 90 toward engagement with the lower hinge portion 84.

Figure 9:
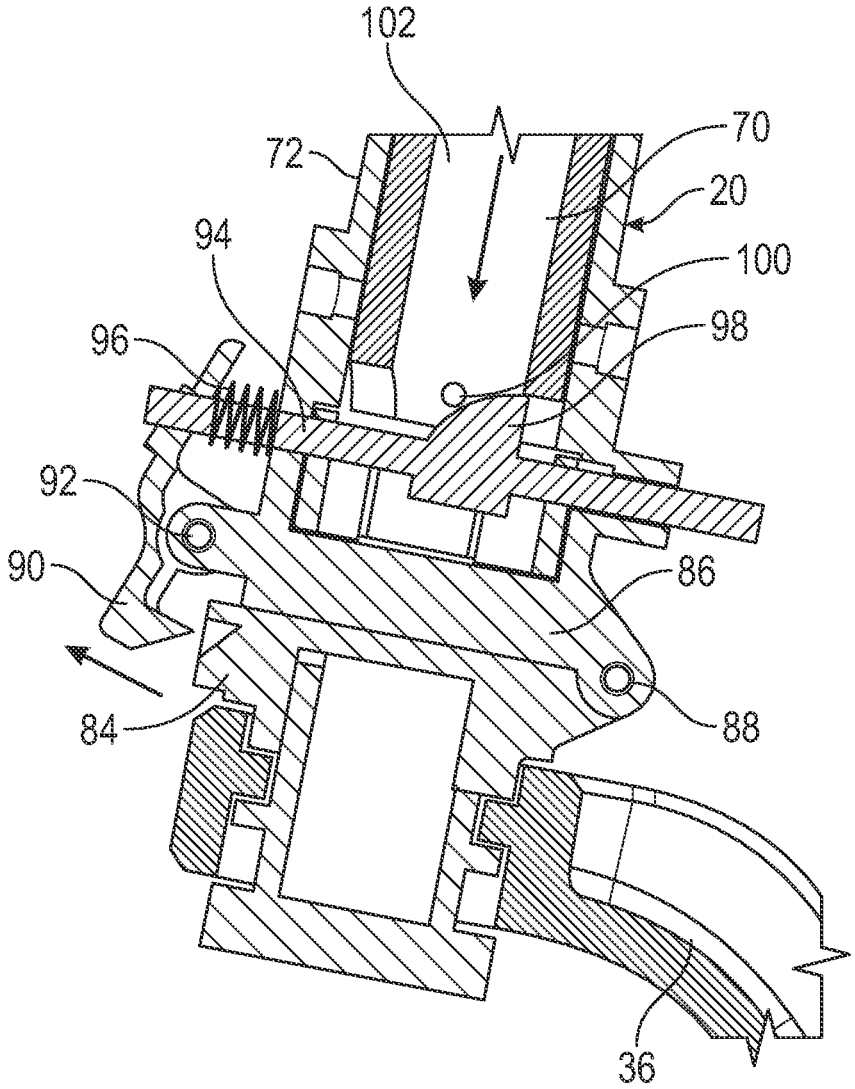
FIG. 9 illustrates release of a pole latch of an embodiment of a personal mobility device.

Referring now to FIG. 9, the connector latch 90 is moved to a released position to allow movement of the pole 20 from the upright position toward the stowed position. To achieve this, the release pin 94 is moved across the lower pole 72 against the bias of the release spring 96. This movement in turn moves the connector latch 90 about the latch pin 92 to release the connector latch 90 from engagement with the lower hinge portion 84, thereby allowing the movement of the pole 20 toward the stowed position. In some embodiments, the release of the connector latch 90 is accomplished automatically with collapse of the upper pole 70 into the lower pole 72. In such embodiments, the release pin 94 includes an oblique pin surface 98 extending toward the upper pole 70. The upper pole 70 includes an upper pole pin 100 extending inwardly from an inner pole surface 102. As the upper pole 70 is collapsed into the lower pole 72, the upper pole pin 100 moves into engagement with the oblique pin surface 98 of the release pin 94. This engagement urges movement of the release pin 94 across the lower pole 72 against the bias of the release spring 96, thus releasing the connector latch 90 from the lower hinge portion 84.

Figure 10:
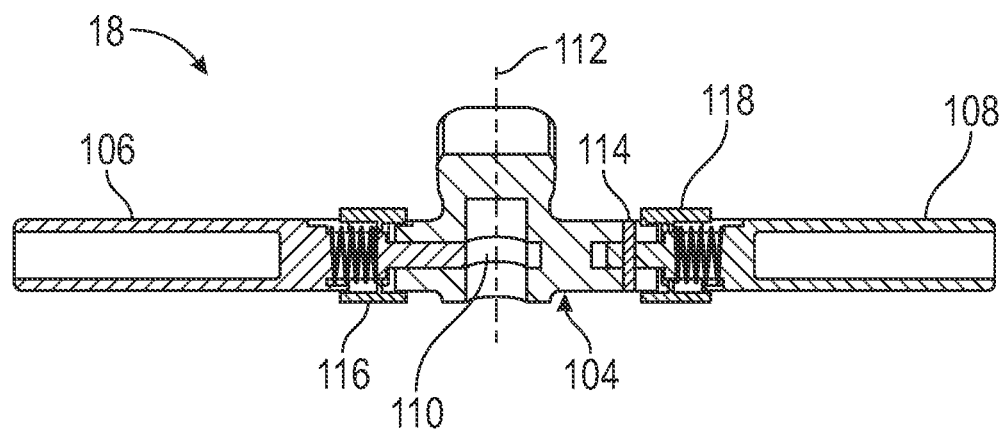
FIG. 10 illustrates an embodiment of a handle assembly of a personal mobility device in an extended position.
Figure 11:
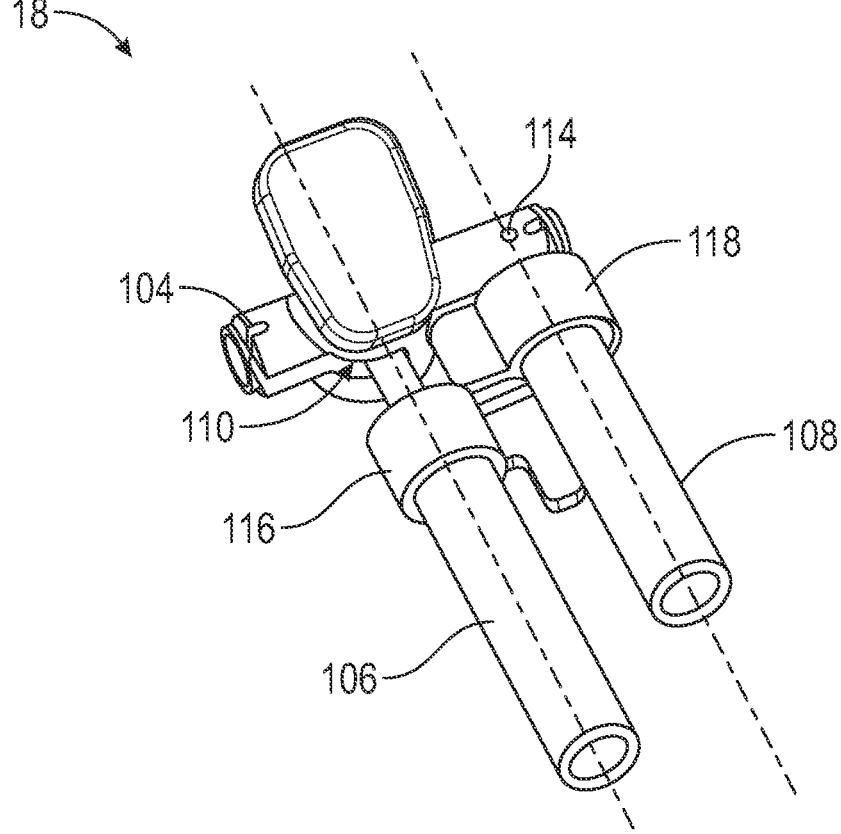
FIG. 11 illustrates an embodiment of a handle assembly of a personal mobility device in a folded position.

Referring now to FIGS. 10 and 11, the handle 18 is movable between an extended position as illustrated in FIG. 10 and a stowed position shown in FIG. 11. The handle 18 includes a main body 104 at which the handle 18 is connected to the upper pole 70. A first handle arm 106 extends from a first lateral side of the main body 104, and a second handle arm 108 extends from a second lateral side of the main body 104. The first handle arm 106 is pivotably connected to the main body 104 at a first handle pivot 110. In some embodiments, the first handle pivot 110 is located at a main body central axis 112. Similarly, the second handle arm 108 is pivotably connected to the main body 104 at a second handle pivot 114. In some embodiments, the second handle pivot 114 is offset from and spaced apart from the main body central axis 112. The first handle arm 106 and the second handle arm 108 are each lockable in the extended position by respective first handle arm latch 116 and second handle arm latch 118. The first handle arm latch 116 and the second handle arm latch 118 are spring loaded to bias the first handle arm latch 116 and the second handle arm latch 118 toward engagement with the first handle arm 106 and the second handle arm 108, respectively, to retain the first handle arm 106 and the second handle arm 108 in the extended position.

The first handle arm 106 is movable toward the stowed position by first releasing the first handle arm latch 116 by, in some embodiments moving the first handle arm latch 116 outwardly against a biasing force of the first handle arm latch 116. The first handle arm 106 may then be rotated about the first handle pivot 110. Similarly, the second handle arm 108 is movable toward the stowed position by releasing the second handle arm latch 118 and then rotating the second handle arm 108 about the second handle pivot 114 toward the first handle arm 106. As shown in FIG. 11, the stowed first handle arm 106 and the second handle arm 108 are secured in the stowed position by, for example, interlocking the first handle arm latch 116 with the second handle harm latch 118. This prevents unintentional movement of the first handle arm 106 and the second handle arm 108 toward their respective extended positions.

The features of the personal mobility device 10 disclosed herein allow for the personal mobility device 10 to be folded and/or collapsed into a compact shape which improves ease of carrying and/or storage of the personal mobility device 10 when not in use.

The terms "a" and "an" do not denote a limitation of quantity, but rather denote the presence of at least one of the referenced item. The term "or" means "and/or" unless clearly indicated otherwise by context. Reference through-out the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

Unless defined otherwise, technical and scientific terms used herein have the same meaning as is commonly under-stood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modi-fications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A personal mobility device, comprising:
a deck;
wheels disposed at opposing ends of the deck;
a pole extending at a proximal end from a first wheel of the wheels; and
a handle disposed at a distal end of the pole;
wherein the deck includes:
    a deck hinge disposed between a first deck end and a second deck end; and
    a deck latch operably connected to the deck hinge to retain the deck in an extended position and config-ured such that releasing of the deck latch allows for folding of the deck about the deck hinge toward a folded position;
further comprising:
    a first wheel bracket connecting the first wheel to the deck; and
    a second wheel bracket connecting a second wheel of the wheels to the deck;
    wherein the deck latch is operably connected to first wheel bracket and the second wheel bracket such that releasing of the deck latch allows for rotation of the first wheel bracket and the second wheel bracket relative to the deck;
wherein the deck latch includes:
    a latch body rotatable about a latch body axis;
    a deck lock arm extending from the latch body and configured for engagement with a complimentary deck tab to retain the deck in the extended position;
    a first wheel release arm extending from the latch body and operably connected to the first wheel bracket to selectably release the first wheel bracket via opera-tion of the deck latch; and
    a second wheel release arm extending from the latch body and operably connected to the second wheel bracket to selectably release the second wheel bracket via operation of the deck latch; and wherein the first wheel release arm and the second wheel release arm are operably connected to the first wheel bracket and the second wheel bracket via one of a wire or a strap.

2. The personal mobility device of claim 1, wherein the first wheel is at least partially nested in the second wheel when the deck is in the folded position.

3. The personal mobility device of claim 1, wherein the deck hinge is located at a midpoint between the first deck end and the second deck end.

4. The personal mobility device of claim 1, wherein the pole includes:
a lower pole portion operably connected to the first wheel; and
an upper pole portion operably connected to the lower pole portion and to the handle, the upper pole portion configured to be selectably movable in the lower pole portion to shorten a length of the pole.

5. The personal mobility device of claim 4, further com-prising a pole stopper configured to retain the upper pole portion in an extended position relative to the lower pole portion, the pole stopper selectably releasable to allow for movement of the upper pole portion into the lower pole portion.

6. The personal mobility device of claim 4, further com-prising a pole latch operably connected to the lower pole portion, the pole latch configured to retain the pole in an upright position relative to the deck and allow for folding of the pole toward the deck when the pole latch is released.

7. The personal mobility device of claim 6, wherein the pole latch is configured to be automatically released when the upper pole portion is lowered into the lower pole portion.

8. The personal mobility device of claim 1, wherein the handle includes:
a handle main body connected to the pole;
a first handle arm extending from a first side of the handle main body, the first handle arm pivotable about a first arm pivot relative to the handle main body; and
a second handle arm extending from a second side of the handle main body opposite the first side and pivotable about a second arm pivot relative to the handle main body;
wherein the first arm pivot is non-coaxial with the second arm pivot.

9. The personal mobility device of claim 1, further com-prising an electric motor operably connected to the first wheel to drive the personal mobility device.

10. The personal mobility device of claim 9, wherein the electric motor is embedded in the first wheel.

11. A personal mobility device, comprising:
a deck;
wheels disposed at opposing ends of the deck; and
a pole extending at a proximal end from a first wheel of the wheels;
wherein the pole includes:
    a lower pole portion operably connected to the first wheel;
    an upper pole portion operably connected to the lower pole portion and to a handle, the upper pole portion configured to be selectably movable in the lower pole portion to shorten a length of the pole; and
    a pole latch operably connected to the lower pole portion, the pole latch configured to retain the pole in an upright position relative to the deck and allow for folding of the pole toward the deck when the pole latch is released;

wherein the pole latch is configured to be automatically released when the upper pole portion is lowered into the lower pole portion.

12. The personal mobility device of claim 11, wherein the pole latch includes:

a lower hinge portion connected to the first wheel;

an upper hinge portion connected to the lower pole portion and connected to the lower hinge portion via a hinge pivot; and a connector latch configured to latch the upper hinge portion to the lower hinge portion.

13. The personal mobility device of claim 11, further comprising a release pin operably connected to the connector latch and extending through the lower pole portion, the release pin configured such that lowering of the upper pole portion into the lower pole portion engages the upper pole portion with the release pin thereby urging release of the connector latch and allowing for folding of the pole toward the deck.

14. The personal mobility device of claim 11, further comprising a handle disposed at a distal end of the pole, the handle including:

a handle main body connected to the pole;

a first handle arm extending from a first side of the handle main body, the first handle arm pivotable about a first arm pivot relative to the handle main body; and a second handle arm extending from a second side of the handle main body opposite the first side and pivotable about a second arm pivot relative to the handle main body;

wherein the first arm pivot is non-coaxial with the second arm pivot.

15. The personal mobility device of claim 11, wherein the deck includes:

a deck hinge disposed between a first deck end and a second deck end; and a deck latch operably connected to the deck hinge to retain the deck in an extended position and configured such that releasing of the deck latch allows for folding of the deck about the deck hinge toward a folded position.

16. The personal mobility device of claim 15, further comprising:

a first wheel bracket connecting the first wheel to the deck; and a second wheel bracket connecting a second wheel of the two wheels to the deck;

wherein the deck latch is operably connected to first wheel bracket and the second wheel bracket such that releasing of the deck latch allows for rotation of the first wheel bracket and the second wheel bracket relative to the deck.

17. The personal mobility device of claim 16, wherein the deck latch includes:

a latch body rotatable about a latch body axis;

a deck lock arm extending from the latch body and configured for engagement with a complimentary deck tab to retain the deck in the extended position;

a first wheel release arm extending from the latch body and operably connected to the first wheel bracket to selectably release the first wheel bracket via operation of the deck latch; and a second wheel release arm extending from the latch body and operably connected to the second wheel bracket to selectably release the second wheel bracket via operation of the deck latch.

18. The personal mobility device of claim 17, wherein the first wheel release arm and the second wheel release arm are operably connected to the first wheel bracket and the second wheel bracket via one of a wire or a strap.

19. The personal mobility device of claim 11, further comprising an electric motor to drive the personal mobility device.

20. The personal mobility device of claim 19, wherein the electric motor is embedded in the first wheel.

* * * * *